United States Patent [19]

Templeton

[11] 3,722,196
[45] Mar. 27, 1973

[54] CUTTER BAR ASSEMBLY

[76] Inventor: William E. Templeton, 1807 West Hanley Road, Lexington, Ohio 44904

[22] Filed: May 19, 1971

[21] Appl. No.: 145,052

Related U.S. Application Data

[63] Continuation-in-part of Ser. No. 104,354, Jan. 6, 1971, abandoned.

[52] U.S. Cl. ................................................56/298
[51] Int. Cl. ...........................................A01d 55/02
[58] Field of Search............................56/296-312

[56] References Cited

UNITED STATES PATENTS

| | | | |
|---|---|---|---|
| 208,874 | 10/1878 | Wright | 56/310 |
| 1,310,339 | 7/1919 | Hollomon | 56/309 |
| 2,024,309 | 12/1935 | Smith | 56/305 |
| 3,314,222 | 4/1967 | Scarnato et al | 56/305 |
| 3,455,093 | 7/1969 | Stern | 56/305 |
| 1,601,826 | 10/1926 | Griffin | 56/308 |
| 1,210,910 | 1/1917 | Dain | 56/308 |
| 3,553,948 | 1/1971 | White | 56/307 |
| 3,577,716 | 5/1971 | McCarty | 56/259 |

*Primary Examiner*—Russell R. Kinsey
*Attorney*—Watts, Hoffman, Fisher & Heinke

[57] ABSTRACT

A cutter bar assembly including an improved sickle support system whereby each of the guards has an integrally formed upwardly facing bearing surface extending the entire width of the guard in the area to the rear of its ledger plate. The bearing surfaces are juxtaposed such that together they extend the entire length of the sickle. A plurality of hold-down brackets overlie the sickle at regularly spaced positions and are adjustable to provide appropriate clearances.

11 Claims, 5 Drawing Figures

INVENTOR.
WILLIAM E. TEMPLETON
BY
Watts, Hoffmann, Fisher & Heinke
ATTORNEYS

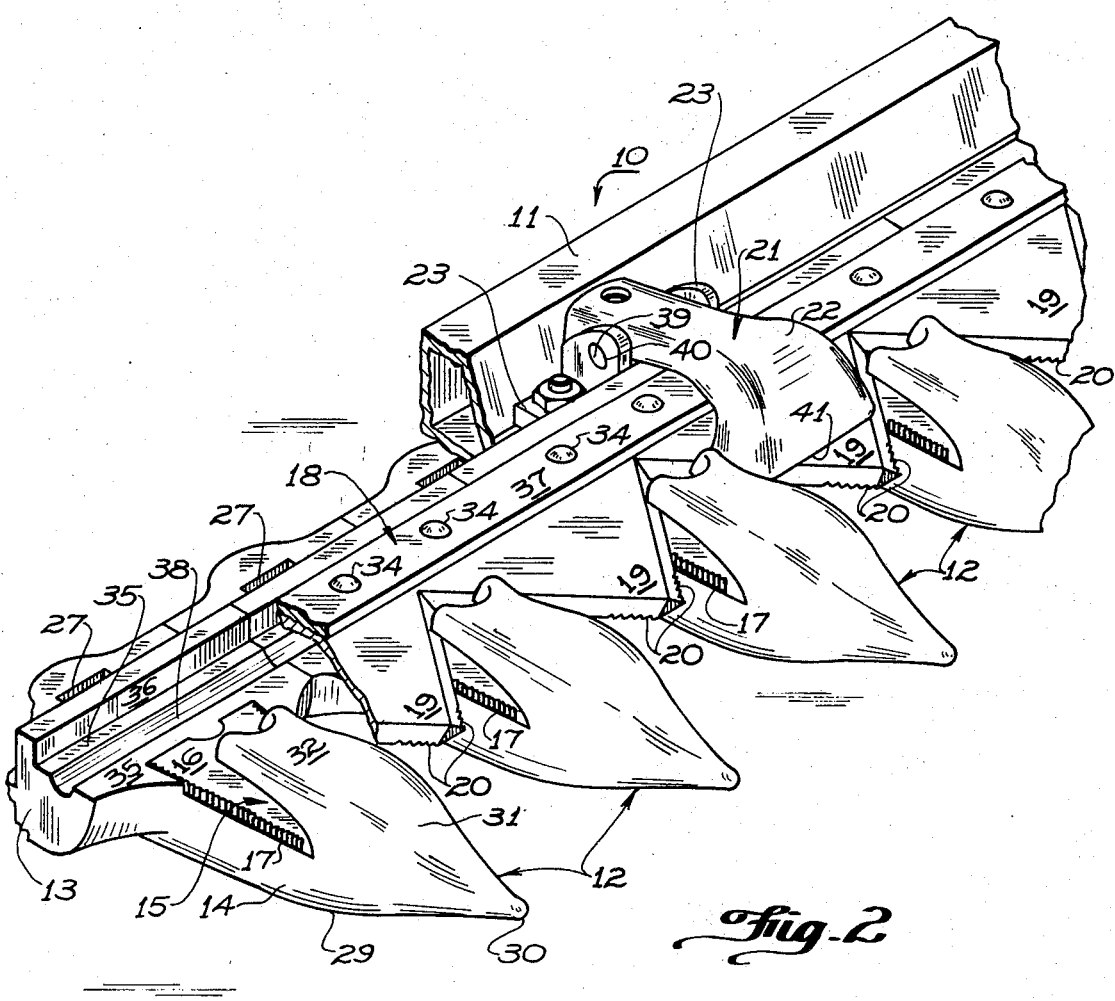

CUTTER BAR ASSEMBLY

This application is a continuation-in-part of Ser. No. 104,354, filed Jan. 6, 1971, now abandoned.

CROSS REFERENCE TO RELATED PATENT

Cutter Bar, U.S. Pat. No. 3,136,109, issued June 9, 1964 to W. E. Templeton.

BACKGROUND OF THE INVENTION

1. Field of the Invention

The present invention relates to an improved cutter bar assembly of the type employing a reciprocating cutter or sickle, and more specifically, to a cutter bar assembly equipped with a new sickle support system.

2. Description of the Prior Art

Cutter bar assemblies using reciprocating sickles are old and well known. While changes have been made many such farm implements as mowers currently manufactured and sold have cutter bar assemblies which are substantially unchanged in configuration from those made for many years. Few embody improvements such as that described and claimed in the referenced patent. Typically, the components of these cutter bar assemblies such as guards, ledger plates, sickle sections, and hold-down brackets possess extremely short operating lives requiring very frequent repair and replacement.

While various proposals have been made to improve the configuration and arrangement of the above listed components, such improvements have not yielded a significant increase in operating life. Testing and usage of a wide variety of cutter component configurations has proved so futile that, in fact, a number of manufacturers have turned to the less desirable alternative of manufacturing cutter components which are sufficiently inexpensive to permit them to be thrown away and replaced after minimal use.

SUMMARY OF THE PRESENT INVENTION

The present invention is directed to a cutter bar assembly having an improved sickle support system for a reciprocating cutter. The support system provides a significant improvement in cutter component operating life. By the arrangement of the present invention, an improved sickle bearing support surface and improved hold-down brackets are provided having a number of advantages which will be discussed.

It has been discovered that a reciprocating cutter can be constructed which will have a greatly extended operating life and which will require no applied lubricants. By providing a continuous bearing surface beneath the sickle, a region is provided where plant juices may collect to provide a highly effective lubrication between the sickle and its support. By this arrangement, the sickle is self lubricating and the need for petroleum or other applied lubricants is eliminated. In addition to the obvious advantages in reduced cost of operation and maintenance, this self lubrication actually greatly increases the life of the sickle. This is true at least in part because oils and greases retain sand and other dirt particles which act as abrasives.

The bearing surface is formed integrally with the guards. Each guard has a bearing surface extending over its entire width and contiguous guards abut to provide a continuous bearing which effectively shields the sickle from beneath. Substantially only the cutter area portions of the sickle sections are left unsupported and unguarded from beneath. Sickle breakage due to contact with foreign objects is thereby reduced, and penetration of dirt and other foreign objects onto the bearing surface is minimized.

Wearing of the bearing surface and other cutter components is further reduced by the provision of adjustable hold-down brackets. By providing a means to accurately adjust the space between the hold-down brackets and the upper surface of the sickle this space may be maintained at a minimal clearance such as 0.002 inch. The sickle is thereby prevented from deflecting away from the ledger plates. This eliminates the balling-up of grasses between the sickle sections and the ledger plates thereby greatly improving the operating life of these components. Moreover, the sickle is accurately held for reciprocation in a plane parallel to its bearing support surface thereby assuring a minimal and even wearing of these components.

The guards and hold-down brackets are preferably formed of an aluminum alloy of the type sold by the American Smelting and Refining Company under the tradename TENZALOY Such an aluminum alloy is hard and strong, and forms an excellent bearing surface.

Tests of the sickle support system of the present invention on mowers used by the Ohio State Highway Commission have shown an improvement in cutter component life up to 5 weeks, where it was previously commonplace to replace the cutting components as often as three times daily during use.

Accordingly, the object of the present invention is to provide a novel and improved sickle support system requiring minimal lubrication and having a greatly increased operating life.

Other objects and a fuller understanding of the invention may be had by referring to the following description and claims taken in conjunction with the accompanying drawings.

BRIEF DESCRIPTION OF THE DRAWINGS

FIG. 2 is a perspective view being partially broken away and having some parts removed to more clearly show the details of the sickle support system of the present invention;

DESCRIPTION OF THE PREFERRED EMBODIMENT

Figure 1:
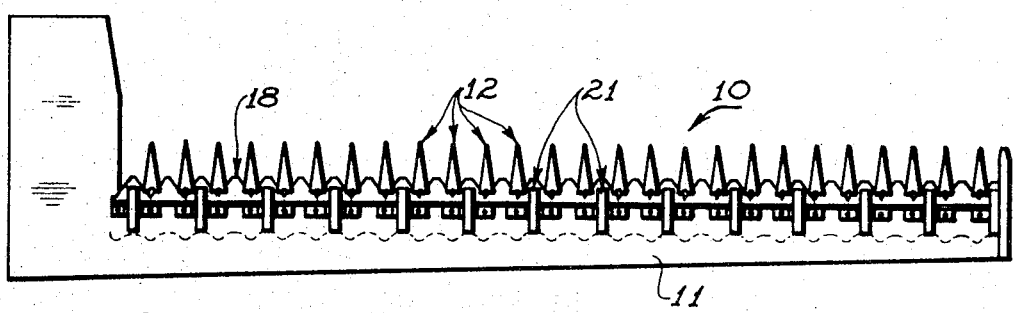
FIG. 1 is a plan view of a cutter bar assembly including the improved sickle support system of the present invention.

Referring initially to FIG. 1, a cutter bar assembly is shown generally at 10. The cutter bar assembly 10 may comprise an elongate support bar 11 of the type described and claimed in the referenced patent. A plurality of guards 12 are carried by the support bar 11 and positioned side by side therealong. As may best be seen in FIG. 2, each of the guards comprises an enlarged base portion 13 and a forwardly projecting finger 14. Each of the fingers 14 carries a ledger plate 15 having an upwardly facing hardened wear surface 16 with forwardly extending cutting edges 17.

An elongate sickle 18 includes a plurality of sickle sections 19 with forwardly extending cutting edges 20 formed therealong. Reciprocation of the sickle 18 will cause the cutting edges 20 to move relative to the cutting edges 17 to provide a cutting or shearing action between the sickle sections and the ledger plates.

A plurality of sickle hold-down brackets indicated generally by the numeral 21 overlie the sickle 18 at the regularly spaced positions. As viewed from above in FIG. 3, it may be seen that the hold-down brackets each comprise a forwardly extending arm 22 having mounting flanges 23 extending transversely on either side of the arm.

Figure 3:
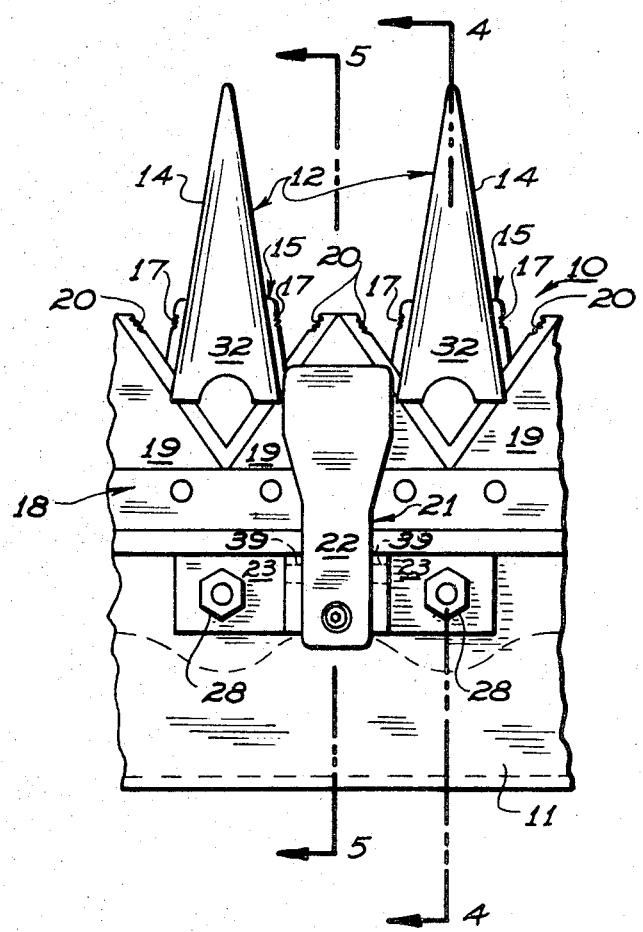
FIG. 3 is an enlarged plan view showing a portion of the cutter bar of FIG. 1.
Figure 4:
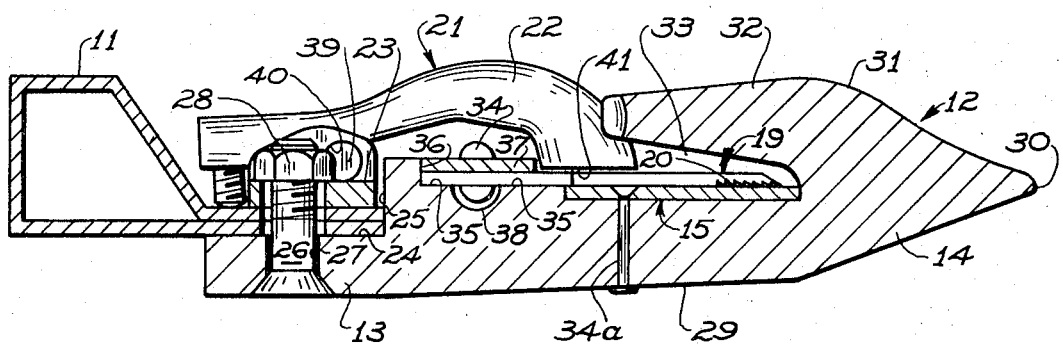
FIG. 4 is an enlarged transverse sectional view as seen from the plane indicated by the line 4—4 of FIG. 3; and, FIG. 5 is an enlarged transverse sectional view as seen from the plane indicated by the line 5—5 of FIG. 3.
Figure 5:
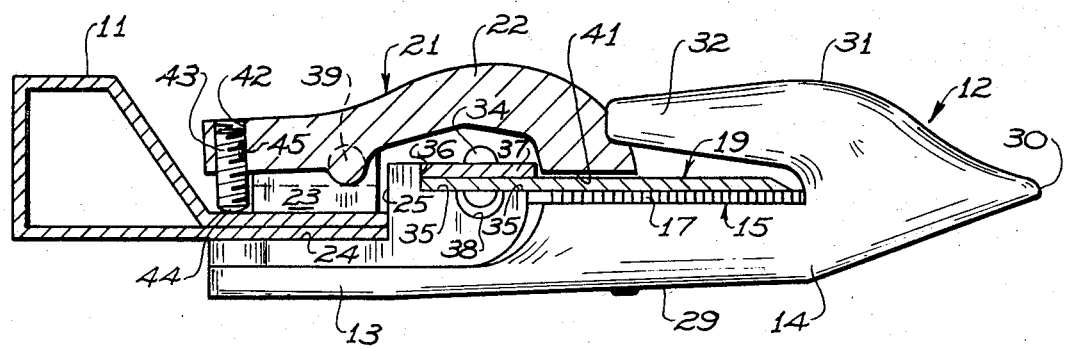

The configuration and arrangement of the guards 12 may be more clearly seen by referring to FIGS. 4 and 5 in conjunction with FIG. 3. The base portion 13 of each of the guards 12 comprises a substantially horizontally extending machined surface 24 which terminates in an upwardly extending shoulder 25. Both the surface 24 and the shoulder 25 engage the support bar 11 to provide a rigid connection therebetween. A mounting bolt 26 extends upwardly through an aperture 27 in the base portion 13, then through the support bar 11, and through the mounting flange 23 where it is secured by a nut 28.

The forwardly projecting fingers 14 each comprise a lower surface 29 which turns upwardly toward its frontal end terminating in a blunt point 30. From the blunt point 30 the upper surface of the finger extends rearwardly at a sharp upward incline to the vicinity of the forward end of the ledger plate 15 where a rounded nose 31 is formed. From the nose 31 the finger extends rearwardly forming a cantilevered guard portion 32. This guard portion overlies and is spaced from the ledger plate 15 to define a space 33 for reciprocation of sickle sections 19 therethrough. By this arrangement, the finger provides a lower portion to which the ledger plate 15 is secured by a rivet 34a, an upper guard portion 32 which shields the ledger plate, and a forwardly projecting pointed portion adapted to lift grasses and direct them into the vicinity of the cutting mechanism.

A bearing surface 35 is integrally formed on the guards. As may best be seen in FIG. 2, portions of the bearing surface 35 extend the entire width of each of the guards in areas to the rear of the ledger plates. The bearing surface is formed in the plane of the hardened wear surfaces 16 and is terminated rearwardly by an upwardly extending shoulder 36. The sickle 18 comprises an elongate sickle bar 37 having sickle sections 19 secured to the underside thereof by means of rivets 34. In order to accommodate the rivet heads during sickle reciprocation an elongated groove 38 is formed in the bearing surface 35 transverse relative to the guards 12.

By extending portions of the bearing surface 35 the full width of each guard, and by providing contiguous guards having abutting bearing surface portions, the sickle is fully supported and also shielded from beneath. At least 75 percent of the underside of the sickle may be supported and shielded in this fashion. Only portions of the cutting area of the sickle sections between the fingers are unguarded from beneath. The sickle is shielded from contact with foreign objects, and penetration of foreign objects into the area between the bearing surfaces and the sickle is minimized.

Each of the arms 22 of the hold-down brackets 21 is pivotally mounted intermediate its ends. A pair of opposed cylindrical projections 39 extend transversely of each arm 22. The mounting flanges 23 each have a hole 40 formed through their upwardly turned legs to pivotally engage one of the projections 39.

The forward ends of each of the arms 22 terminate in an enlarged downwardly facing guide surface 41 which overlies the upper surface of the sickle sections 19 in parallel relation. The rearward or opposite ends of the arms 22 each carry an adjustment means to selectively adjust and maintain the space between the guide surface 41 and the upper surface of the sickle sections 19 and the clearance between the sickle sections and the bearing surface 35.

As best seen in FIG. 5, the adjustment means comprises a substantially vertically extending threaded hole and a set screw 43 positioned in the hole 42. The lower end 44 of the set screw 43 is positioned to engage the upper surface of the support member 11. The set screw 43 is held securely in place by a suitable locking means such as a nylon insert 45. Rotational adjustment of the set screw will cause arm 22 to pivot about the projections 39 whereby the space between guide surface 41 and the upper surface of sickle sections 19 and the bearing clearance is adjusted. By this arrangement, a minimal clearance such as 0.002 inch can be maintained between the guide surface 41 and the sickle sections 19. The sickle sections 19 are thereby effectively prevented from deflecting away from the ledger plates. Since the sickle sections and the ledger plates are held together the balling up of grasses between the sickle sections and the ledger plates is eliminated. Additionally, the holddown brackets serve to accurately restrict sickle reciprocation to a plane parallel to the bearing support surface 35. This assures even and minimal wearing of the bearing surface 35.

The guards and hold-down brackets are preferably formed of an aluminum alloy of the type sold under the trade-name TENZALOY, as previously mentioned. The sickle sections and ledger plates are formed of hardened steel. The support bar is also formed of steel and is sufficiently rigid to prevent flexing or bending thereby alleviating unnecessary wear.

As was previously mentioned, one significant advantage of the sickle support system of the present invention is the virtual elimination of the need for sickle lubrication. By providing the continuous bearing support surface 35 backed up by the shoulder 36, a region is provided where plant juices may collect to provide a highly effective lubrication between the sickle and the guard shoes. The addition of greases and oils in fact, reduces the operating life of the sickle as such lubricants collect and hold sand and other abrasives. Sand impregnated lubricants tend to function as a grinding compound that distributes itself across the bearing surfaces. By eliminating the need for such petroleum lubricants, the present invention is not subject to the type of abrasive wear as is occasioned by abrasives attracted and held by such lubricants. The cutter bar assembly components of the present invention therefore enjoy a substantially longer operating life than is obtained in prior cutter bar systems.

Although the foregoing description is necessarily of a detailed character, in order that the invention may be set forth, it is to be understood that the specific terminology is not intended to be restrictive or confining, and that various rearrangements of parts and modifications of detail may be resorted to without departing from the scope or spirit of the invention as herein claimed.

What is claimed as new and desired to secure by Letters Patent of the United States is:

1. A cutter bar assembly, comprising:
   a. an elongate support bar;
   b. a plurality of guards carried by said support bar in side-by-side relationship therealong and cooperating to define an array of forwardly projecting fingers;
   c. ledger plates carried by said fingers and having forwardly extending cutting edges;
   d. said guards and said ledger plates having upwardly facing surfaces formed thereon which lie substantially within a common plane and which cooperate to define a substantially continuous support surface;
   e. said guards having forwardly facing shoulder surfaces formed thereon which lie substantially within the same plane and which cooperate one with another to define a substantially continuous guide surface;
   f. said guide surface extending upwardly from a position rearwardly along said support surface and cooperating with said support surface to form an L-shaped bearing structure;
   g. a sickle including an elongate bar and a plurality of sickle sections carried on said elongate bar, said sickle defining downwardly facing bearing portions supported on said support surface and rearwardly facing bearing portions engaging said guide surface;
   h. said bearing structure and said bearing portions cooperating to slidably support said sickle for movement along said guards with the portion of said sickle which extends rearwardly of said ledger plates being shielded by said bearing structure.

2. The cutter bar assembly of claim 1 wherein said common plane and said same plane are mutually perpendicular.

3. The cutter bar assembly of claim 1 wherein said guards comprise an aluminum alloy.

4. The cutter bar assembly of claim 1 additionally including hold-down means pivotally supported on said support bar and having downwardly facing surface portions which overlie the upper surface of said sickle sections, and means to selectively adjust and maintain a minimal clearance between said downwardly facing surface portions and said upper surface of said sickle sections.

5. The cutter bar assembly of claim 4 wherein said hold-down means comprises an aluminum alloy.

6. The cutter bar assembly of claim 4 wherein said hold-down means comprises a plurality of brackets which overlie said sickle at spaced apart positions therealong, each of said brackets including an arm having downwardly facing surface portions formed at one end and having an adjustment means associated with the other end for selectively adjusting and maintaining the space between said downwardly facing surface portions and said upper surface of said sickle sections.

7. In a reciprocating cutter of the type including an elongate support bar and an elongate sickle reciprocable along said elongate support bar, an improved sickle support system comprising:
   a. a plurality of guards carried by the support bar and positioned in side-by-side relationship therealong;
   b. said guards having forwardly extending fingers formed integrally therewith;
   c. ledger plates carried on said fingers and having upwardly facing surface portions lying substantially within a common plane;
   d. said guards having upwardly facing surface portions formed thereon in regions rearwardly of said ledger plates, said guard surface portions lying substantially within said common plane and extending continuously between opposite sides of said guards in said regions;
   e. said guards having forwardly facing shoulder portions formed thereon rearwardly of said guard surface portions, said shoulder portions lying substantially within the same plane and extending continuously between opposite sides of said guards;
   f. adjacent ones of said guards being disposed in abutting contact with adjacent guard surface portions and adjacent shoulder portions in contact with each other to define a contiguous L-shaped bearing support for the sickle; and,
   g. a plurality of hold-down brackets overlying said guard surface portions at spaced-apart positions along said bearing support and having adjustment means associated therewith for selectively adjusting and maintaining a desired clearance between said brackets and said bearing support for supporting the sickle therebetween with a minimum of play.

8. The sickle support system of claim 7 wherein said common plane and said same plane are mutually perpendicular.

9. The sickle support system of claim 7 wherein said hold-down brackets each comprise:
   a. an elongate arm having downwardly facing surface portions formed integrally with one end and adapted to overlie in parallel spaced relationship thereto said upper surface of the sickle;
   b. adjustment means carried by said arm adjacent the other end thereof for selectively adjusting and maintaining the space between said downwardly facing surface portions and the upper surface of the sickle;
   c. said arm having a pair of opposed projections formed integral therewith intermediate said ends; and,
   d. mounting means carried by the support bar and adapted to receive said projections to provide a pivotal support for said arm;
   e. whereby said arm pivots about said projections in response to adjustment of said adjustment means.

10. For use in conjunction with a reciprocating cutter of the type including a support bar, a plurality of guards supported in side-by-side abutting relationship along the support bar, and a sickle supported by the guards for reciprocation, the improved guard structure comprising:
- a. a guard having integrally formed mounting, finger and bearing portions;
- b. said mounting portion defining the rearward region of the guard and being adapted to be secured to the support bar;
- c. said finger portion defining the forward region of the guard and including at least one finger projecting forwardly in cantilevered fashion from said mounting portion;
- d. a ledger plate carried on said finger and having an upwardly facing surface with at least one forwardly extending cutting edge formed therealong;
- e. said bearing portion including opposite parallel extending sides defining the maximum width of the guard;
- f. said bearing portion additionally defining support and guide surface portions extending continuously between said sides in regions rearwardly of said ledger plate;
- g. said support surface portions being disposed in a common plane with said upwardly facing ledger plate surface;
- h. said guide surface portions being disposed in a plane which is substantially perpendicular to said common plane and extending upwardly from said support surface portions;
- i. whereby said support and guide surface portions define a sickle support region of L-shaped cross section which extends continuously between opposite sides of said guard enabling a plurality of such guards disposed in side-by-side abutting relationship to form a contiguous sickle support region of L-shaped cross section to support and shield the sickle during reciprocation along the guards.

11. The guard structure of claim 10 wherein said integrally formed portions comprise an aluminum alloy.

* * * * *